United States Patent [19]

Schupp et al.

[11] Patent Number: 4,568,729
[45] Date of Patent: Feb. 4, 1986

[54] PROCESS FOR THE PREPARATION OF UREA CONDENSATES AND THEIR USE

[75] Inventors: Eberhard Schupp, Schwetzingen; Werner Loch, Erpolzheim; Rolf Osterloh, Gruenstadt; Klaas Ahlers, Muenster, all of Fed. Rep. of Germany

[73] Assignee: BASF Aktiengesellschaft, Fed. Rep. of Germany

[21] Appl. No.: 547,084

[22] Filed: Oct. 31, 1983

[30] Foreign Application Priority Data

Mar. 30, 1983 [DE] Fed. Rep. of Germany .... 3311514

[51] Int. Cl.$^4$ ............................................. C08L 63/02
[52] U.S. Cl. .................................. 525/523; 204/181.7; 428/416; 523/414; 524/901; 524/904; 525/55; 525/403; 525/437; 525/467; 525/490; 525/540; 528/367; 528/368
[58] Field of Search ................ 528/367, 368; 525/523, 525/381, 382, 403, 437, 467, 55, 540, 490; 523/418, 417

[56] References Cited

U.S. PATENT DOCUMENTS 4,104,147  8/1978  Marchetti et al. .............. 204/181 C
4,178,427 12/1979  Waddill et al. ..................... 528/367

FOREIGN PATENT DOCUMENTS 2419179  4/1974  Fed. Rep. of Germany .
2942488 10/1979  Fed. Rep. of Germany .
3021300  6/1980  Fed. Rep. of Germany .
3121765  6/1981  Fed. Rep. of Germany .
   2147  3/1963  Japan ............................. 528/367

OTHER PUBLICATIONS

R. Pasedag, Conference of the GDCh Specialist Group Macromolecular Chemistry in Bad Nauheim, 1966.

Primary Examiner—Theodore E. Pertilla
Attorney, Agent, or Firm—Keil & Weinkauf

[57] ABSTRACT

The present invention relates to a process for the preparation of urea condensates and to their use.

To prepare these urea condensates, a primary di and/or polyamine is reacted with urea, a secondary monoamine and if appropriate a polyalcohol at elevated temperatures in the presence or absence of catalysts, and the ammonia formed is separated off.

These urea condensates are suitable as binder components in thermosetting surface coatings.

24 Claims, No Drawings

PROCESS FOR THE PREPARATION OF UREA CONDENSATES AND THEIR USE

The present invention relates to a process for the preparation of urea condensates from primary polyamines, urea, secondary amines and if appropriate polyols, and to their use as binder components in thermosetting surface coatings.

The preparation of copolymers of diamines with urea has been disclosed (cf. R. Pasedag, Conference of the GDCh Specialist Group Macromolecular Chemistry in Bad Nauheim, 1966). However, although the products obtained could be used for injection molding and blow molding, their poor solubility made them unsuitable for surface coatings.

It is an object of the present invention to provide a process for the preparation of urea condensates, by means of which products which can be used as binder components for thermosetting surface coatings can be prepared in a simple manner. Surprisingly, this object can be very advantageously achieved by the process according to the invention.

The present invention relates to a process for the preparation of urea condensates, wherein (A) at least one primary di- and/or polyamine is reacted with
(B) urea,
(C) at least one secondary amine and if appropriate
(D) one or more polyalcohols at elevated temperatures in the presence or absence of catalysts, and the ammonia formed is separated off.

The present invention also relates to urea condensates which are obtainable by the process according to the invention.

The present invention furthermore relates to the use of the urea condensates prepared according to the invention as binder components in thermosetting surface coatings, for powder coating and in particular in cathodic electrocoating finishes.

Using the process according to the invention, urea condensates which can be very advantageously used as binder components in thermosetting surface coatings can be prepared in a simple manner. When used as additives to self-crosslinking binders, the urea condensates according to the invention result in greater hardness and flexibility of the film, while in the case of non-self-crosslinking binders the urea condensates according to the invention may furthermore assume the function of a highly effective crosslinking agent, which leads to hard, crosslinked films at above about 130° C.

With regard to the components to be used for the preparation process according to the invention, the following may be stated specifically:

(A) Suitable primary di- and/or polyamines (A) are in principle all aliphatic, cycloaliphatic and aromatic polyamines which contain at least two primary amino groups, with the exception of non-cyclic aliphatic amines having less than 4 carbon atoms between the primary amino groups and cycloaliphatic or aromatic amines whose primary amino groups are separated from one another by less than 3 carbon atoms, since these amines and ureas form cyclic ureas. The primary di- and/or polyamines can contain, in addition to the primary amino groups, further functional groups, for example secondary or tertiary amino groups, hydroxyl groups or ether groups. Examples of suitable amines are 1,4-diaminobutane, 1,6-diaminohexane, heptamethylenediamine, octamethylenediamine, nonamethylenediamine, decamethylenediamine and dodecamethylenediamine, and branched aliphatic primary diamines, for example an isomer mixture of 9- and 10-aminostearylamine or of 9- and 10-aminomethylstearylamine, 4,9-dioxadodecane-1,12-diamine, 4,4'-diaminodicyclohexylmethane, 3,3'-dimethyl-4,4'-diaminodicyclohexylmethane, 4,4'-diaminodiphenylmethane, toluylenediamine, tris-(aminoethyl)-amine and tris-(aminopropoxyethyl)-amine.

In addition to such polyamines having a low, defined molecular weight, it is also possible to employ, as component (A), oligomeric or polymeric polyamines having molecular weight of up to 3,000. Examples of such polyamines are diamines which can be prepared by reductives cyanoethylation of polyols, such as polytetrahydrofuran. The products of this type contain terminal primary amino groups in the form of aminopropoxy groups.

The amines described above can be used alone or as a mixture with one another.

(B) Component (B) is urea.

(C) In principle, any desired secondary amines can be employed as the secondary amines (C). Preferred amines are those which have a boiling point below 250° C., particularly preferably those having a boiling point of from 100° to 200° C. Examples of particularly preferred amines are di-n-propylamine, di-isopropylamine, di-n-butylamine, di-isobutylamine and di-n-hexylamine.

(D) If appropriate, a polyalcohol (D) containing at least 2 hydroxyl groups may also be used. The presence of such polyalcohols can in many cases lead to improved compatibility of the novel products with other binder components. Polyalcohols containing more than 2 hydroxyl groups can be used in order to increase the functionality of the novel urea condensates. The presence of some polyols in the preparation of novel binder components which are employed for cathodic electrocoating can even lead to better electric strength and better flowing power of the electrocoating finishes. Examples of polyalcohols which can be used are ethylene glycol, propylene 1,3-glycol, butane-1,4-diol, trimethylolpropane, trishydroxyethyl isocyanurate and pentaerythritol.

For the novel preparation of the urea condensates, the components (A), (B), (C) and if appropriate (D) are reacted together at elevated temperatures, for example by gradually heating them together to 140°–230° C., preferably to 150°–210° C. During this procedure, it is not generally necessary to use a catalyst, but catalysts, such as basic catalysts, eg. sodium methylate, or acidic catalysts, such as p-toluenesulfonic acid or β-naphthalenesulfonic acid, heavy metal salts, preferably Cu(I) salts, such as copper(I) chloride or copper(I) bromide, may additionally be used in amounts of up to 3% by weight, based on the total amount of components (A) to (C) or (A) to (D).

It is not necessary to employ all of the components (A) to (C), or (A) to (D), at the same time; for example, it is also possible first to react the urea (B) and the primary di- and/or polyamine (A) at 110°–150° C. and then to add the secondary amine (C) either at once or gradually as the conversion progresses, the temperature advantageously being kept at 140°–230° C. Gradual addition is possible in cases in which a secondary amine having a relatively low boiling point is employed and the process is not carried out under superatmospheric pressure. When the addition is complete, the components are allowed to continue reacting in general for a further 1 to 20 hours.

If polyalcohols (D) are used concomitantly, these can be added together with the amines to the urea; however, it is also possible first to react only components (A) to (C) and then to react the resulting mixture with the polyalcohol (D).

The ratios in which the individual components (A) to (D) are employed are not critical. In general the ratio of the number of equivalents of $NH_2$ groups of the primary di- and/or polyamines (A) to $NH_2$ groups of the urea (B) to NH groups of the secondary monoamine (C) to OH groups of the polyalcohol (D) is 1 to 1.2–2.4 to 0.2–20 to 0–0.9, or about 2 equivalents of the sum of (A), (C) and (D) are used per mole of urea (B). In order to accelerate the reaction, it is also possible to employ an excess of (C), the excess being removed again at the end of the reaction.

The preparation of the urea condensates can be carried out in inert solvents, such as relatively high-boiling hydrocarbons or ethers. Examples of suitable solvents are toluene, xylene and hydrocarbon fractions boiling within a range from 120° to 200° C., and a suitable ether is 5,8-dioxadodecane. However, the reaction can also be carried out in the absence of a solvent.

The urea condensates prepared according to the invention are very suitable as binder components in thermosetting surface coatings. If they are added to self-crosslinking binders, they result in greater hardness and flexibility of the baked surface coating films and improve the adhesion to metal and corrosion protection; in the case of non-self-crosslinking binders, the novel urea condensates can furthermore assume the function of a highly effective crosslinking agent, which leads to hard, crosslinked films above about 130° C.

Suitable self-crosslinking binders and non-self-crosslinking binders which can be combined with the novel urea condensates are the binders conventionally used in surface coating chemistry. Polyadducts, polycondensates or polymers which have a mean molecular weight $\overline{M}_n$ of from 500 to 10,000 and may be selected from a very large variety of categories of compounds are particularly suitable. The only important factor is that they possess, on average, at least two OH groups and/or primary and/or secondary amino groups. Preferably, the component should have a resin-like character. Examples of suitable materials are polyesters, alkyd resins, polyethers, polyacrylate resins, polyurethanes, epoxy resins and their reaction products with alcohols, mercaptans or amines. Another suitable class of compounds comprises polydiene resins or oils, eg. polybutadiene oils. It is possible to introduce OH groups into these compounds, for example by addition of mercaptoethanol at some of the double bonds. Another possible method of introducing OH groups is the reaction with maleic anhydride, followed by reaction with OH-containing amines, such as ethanolamine or diethanolamine. The required derivatization can also be carried out by epoxidation of the polybutadiene oils with peracids, followed by reaction with amines.

Suitable polyesters are those which have a mean molecular weight $\overline{M}_n$ of from 500 to 10,000 and a hydroxyl number of from 25 to 400 and they are obtained from aliphatic and/or aromatic dicarboxylic acids of 4 to 10 carbon atoms, for example succinic acid, glutaric acid, adipic acid, pimelic acid, suberic acid, azelaic acid, sebacic acid, cyclohexanedicarboxylic acid, phthalic acid, isophthalic acid or terephthalic acid or their derivatives, and polyhydric alcohols, such as aliphatic diols, eg. ethylene glycol, diethylene glycol, triethylene glycol, polyethylene glycol, propanediol, butanediol, hexanediol, neopentylglycol or neopentylglycol hydroxypivalate, and if appropriate polyhydric alcohols, eg. trimethylolpropane, glycerol, erythritol, pentaerythritol, trimethylolbenzene or trishydroxyethyl isocyanurate.

Suitable alkyd resins have a similar composition but additionally contain one or more monocarboxylic acids, for example fatty acids. Alkyd resins which contain glycidyl esters of branched carboxylic acids can also be used.

Examples of suitable polyethers are aliphatic or araliphatic polyethers which are obtained by reacting dihydric and/or polyhydric alcohols with various amounts of ethylene oxide and/or propylene oxide.

Suitable polyacrylates are OH-containing polyacrylates having a hydroxyl number of from 25 to 500. These should have an acid number of $<25$, preferably $<10$, and a Fikentscher K value (measured on a 3% strength solution in acetone) of from 10 to 40, preferably from 12 to 25, and can, for example, contain the following monomers as copolymerized units: from 10 to 100, preferably from 20 to 40, % by weight, of at least one OH-containing or NH-containing monomer, for example isopropylaminopropyl-methacrylamide or hydroxy-($C_2$–$C_4$)-alkyl esters of an $\alpha,\beta$-ethylenically unsaturated carboxylic acid, for example 2-hydroxyethyl acrylate, 2-hydroxyethyl methacrylate, hydroxypropyl acrylate, hydroxypropyl methacrylate, butanediol monoacrylate and butanediol monomethacrylate, from 0 to 90, preferably from 60 to 80, % by weight, of at least one ethylenically unsaturated carboxyl-free and hydroxyl-free compound, for example vinyl-aromatics, such as styrene and vinyltoluene, vinyl esters of carboxylic acids of 2 to 18 carbon atoms, such as vinyl acetate and vinyl propionate, vinyl ethers of monoalkanols of 1 to 18 carbon atoms, such as vinyl methyl ether and vinyl isobutyl ether, esters of acrylic acid or methacrylic acid with $C_1$–$C_{12}$-monoalkanols, the corresponding maleic acid, fumaric acid and itaconic acid diesters, acrylamide, methacrylamide, acrylonitrile, methacrylonitrile, monomers containing tertiary amino groups, such as diethylaminoethyl acrylate or diethylaminoethylacrylamide and mixtures of these monomers. Another possible method of obtaining basic acrylates is to employ monomers which possess epoxide groups, such as glycidyl methacrylate, and to form adducts of amines with the oxirane rings of the polymers.

Suitable polyurethanes are OH-containing polyurethanes which have a hydroxyl number of from 25 to 600 and are obtainable from aliphatic and/or aromatic diisocyanates, for example tetramethylene diisocyanate, hexamethylene diisocyanate, isophoron diisocyanate, diphenylmethane diisocyanate, toluylene diisocyanate, naphthylene diisocyanate, 4,4'-diphenyl ether diisocyanate and if appropriate dimers or trimers of these, and aliphatic diols, such as ethylene glycol, diethylene glycol, triethylene glycol, polyethylene glycols, propanediol, butanediol, hexanediol, neopentylglycol or neopentylglycol hydroxypivalate, and if appropriate polyhydric alcohols, such as trimethylolpropane, glycerol, pentaerythritol, trimethylolbenzene or trishydroxyethyl isocyanurate.

Examples of suitable epoxy resins are glycidyl ethers as prepared from 2,2-bis-(4-hydroxyphenyl)-propane and epichlorohydrin. These epoxy resins can be modified further, for example by reaction with polyfunctional alcohols or SH compounds. Examples of such polyfunctional alcohols which are suitable for the modification are ethylene glycol, propylene 1,2-glycol, propylene 1,3-glycol and butane-1,4-diol.

If elastification is desired, long-chain polyfunctional alcohols or mercaptans can also be employed. If the polyfunctional alcohols or mercaptans are employed in more than equivalent amounts, based on the epoxide groups present, products having terminal OH or SH groups are formed. If, on the other hand, less than equivalent amounts are employed, the products formed have terminal epoxide groups which can if required be reacted further. While the reaction of mercaptans with epoxide groups proceeds even in the absence of a catalyst, the reaction of the alcohols requires the use of a catalyst, for example dimethylbenzylamine, and relatively high temperatures of about 50°–150° C.

The novel urea condensates can be combined with conventional self-crosslinking binders in amounts such that these binder combinations contain from 2 to 50, preferably from 10 to 40, % by weight of the novel urea condensate and from 50 to 95, preferably from 60 to 90, % by weight of the other self-crosslinking binder.

The proportions in the combinations with non-crosslinking binders are from 10 to 60, preferably from 10 to 40, % by weight of urea condensate and from 40 to 90, preferably from 60 to 90, % by weight of non-crosslinking binder.

The novel binders, with or without additives such as pigments, assistants and curing catalysts, can be applied onto substances such as wood, plastic or metal by means of conventional methods, such as spraying, immersion, brushing, casting and knife-coating.

To prepare powder formulations, in each case solid, solvent-free combinations of the novel urea condensates are dry-milled with other binders, whose softening points in each case should be >60° C. for reasons of blocking resistance, and the mixture obtained is mixed with conventional additives, such as pigments, fillers and leveling agents, for example those based on polyacrylates. The mixtures are then homogenized in the melt at temperatures of about 100° C. (extruder). After the extrudates have cooled to room temperature, they are milled thoroughly. Coarse fractions (about 70 μm) are separated off by sieving. The powder formulations are usually applied by electrostatic powder spraying.

The novel products are particularly suitable for use in binder systems which contain basic groups, especially those which can be diluted with water as a result of protonation with acids, in particular in binder systems for the cathodic electrocoating of electrically conductive substrates, for example metal articles, sheets, etc. consisting of brass, copper, aluminum, metalized plastics or materials coated with conductive carbon, as well as iron and steel which may or may not have been chemically pretreated, for example phosphatized. To effect partial or complete neutralization, an acid, eg. formic acid, acetic acid, phosphoric acid or lactic acid, is added. The novel urea condensates are also suitable as binder components for the EPC (electro powder coating) process.

Examples of such binders which contain basic groups are reaction products of epoxy resins with primary or secondary amines. In particular, the reaction with hydroxyl-containing amines, eg. ethanolamine, methylethanolamine and diethanolamine, may be employed for this purpose.

If such products employed contain sufficient amounts of amino groups to be water-soluble or water-dispersible after protonation with acids, it is possible, in combination with the novel urea condensates, to prepare water-dispersible binders for baking finishes, in particular binders which can be used for cathodic electrocoating. The abovementioned reaction products of epoxy resins with primary or secondary amines can be employed for this purpose.

Many of the carrier resins proposed for cathodic electrocoating can also be employed in combination with the novel urea condensates, examples of such resins being the reaction products of phenolic Mannich bases with epoxy resins as described in German Pat. No. 2,419,179, the reaction products of chain-lengthened epoxy resins with secondary amines as described in U.S. Pat. No. 4,104,147, reaction products of acrylamidomethylated or methacrylamidomethylated phenols, amines and epoxy resins, for example as described in German Laid-Open Applications DOS 2,942,488 and DOS 3,021,300.

It is frequently advantageous to employ products which contain primary and/or secondary amino groups, so as to give aqueous electrocoating baths having high pH values of, for example, from 6.5 to 8.0. As a result of the high pH values, especially those in the region of pH 7 or above, corrosion of equipment can be avoided. A possible method of obtaining suitable products containing primary and secondary amino groups is to react excess primary diamines with epoxy resins and then to separate off the excess amine at elevated temperatures and under reduced pressure.

Particularly suitable diamines for this purpose are those of 2 to 6 carbon atoms, eg. ethylenediamine, 1,2- and 1,3-diaminopropane, 1,4-diaminobutane and hexamethylenediamine. The reaction products can, if desired, be subjected to a chain-lengthening reaction with dicarboxylic acids, for example with sebacic acid or with a dimeric fatty acid. The desired molecular weight can be obtained by varying the ratio of dicarboxylic acid to epoxy resin/amine adduct; for example, 1 mole of dimeric fatty acid can be employed per two molecules of epoxy resin/amine adduct.

Another possible method of preparing suitable products containing primary amino groups is to react epoxy resins with secondary amines which contain blocked primary amino groups. Examples of such amines are the diketimine of diethylenetriamine, the ketimine of aminoethylethanolamine and the ketimine of N-methylethylenediamine. The ketimines can be prepared in a simple manner from the free amine and a ketone, eg. methyl isobutyl ketone, with elimination of water. In the reaction with epoxy resins, only the secondary amino group reacts; the ketimine can then be cleaved by the addition of water, the free primary amino group being formed. By reacting some of the primary amino groups with dicarboxylic acids, these products, too, can be elastified by chain-lengthening.

When used as a component of a surface coating binder, in combination with another self-crosslinking surface coating binder, the novel urea condensates are employed in amounts of about 2–50, preferably 10–40, % by weight, based on the total binder; if they are to be employed in combination with a non-self-crosslinking surface coating binder as the only crosslinking agents, the amounts used are about 10–60, preferably 20–40, % by weight.

The following Examples of preparation and use are intended to illustrate the invention without restricting it. The parts and percentages stated are parts by weight and percentages by weight, unless stated otherwise.

EXAMPLE 1

58 parts of hexamethylenediamine, 60.1 parts of 3,3'-dimethyl-4,4'-diaminodicyclohexylmethane and 90 parts of urea are heated to 160° C. in the course of 2 hours. During this procedure, ammonia is eliminated above about 120° C. The reaction mixture is initially liquid and then solidifies to a white crystalline mass. The temperature is increased, until a clear melt is formed at 180° C. 193.5 parts of dibutylamine are added at this temperature in the course of 8 hours. When the addition is complete, the mixture is kept at 180°–190° C. until refluxing abates; about 4 hours are required for this. After cooling, the urea condensate solidifies to a colorless glassy mass having a softening point of about 100° C.

EXAMPLE 2

134 parts of trimethylolpropane, 360 parts of urea, 387 parts of dibutylamine, 174 parts of hexamethylenediamine and 357 parts of 3,3'-dimethyl-4,4'-diaminodicyclohexylmethane are heated gradually. Above 120° C., ammonia is eliminated and the urea goes into solution. The temperature is increased to 155° C. in the course of 2 hours, vigorous reflux takes place and large amounts of a soft, crystalline deposit separating out. After a further 5 hours under reflux, the precipitate has redissolved and the temperature has reached 165° C. 387 parts of dibutylamine are then added dropwise in the course of 2 hours, and, after the addition is complete, heating is continued for a further 8 hours at 185° C. Thereafter, 360 parts of dibutylamine are stripped off under reduced pressure at this temperature, and the mixture is cooled to 130° C. and then diluted with 517 parts of toluene. The product is a colorless, viscous liquid having a solids content of 70%.

EXAMPLE 3

The procedure described in Example 2 is followed, except that 232 parts of hexamethylenediamine and 238 parts of 3,3'-dimethyl-4,4'-diaminodicyclohexylmethane are employed. 492 parts of toluene are required to dilute the product to a solids content of 70%.

EXAMPLE 4

The reaction is carried out in a pressure-resistant vessel which is equipped with a stirrer and a reflux condenser, and above the reflux condenser there is a pressure-relief valve set at 6 bar. 58 parts of hexamethylene-diamine, 60.1 parts of 3,3'-dimethyl-4,4'-diaminodicyclohexylmethane, 90 parts of urea and 151.8 parts of di-n-propylamine are introduced into the vessel, and the mixture is heated at 185° C. for 5 hours. During heating, a pressure of 6 bar is maintained, and excess ammonia escapes through the pressure-relief valve. After the reaction is complete, the pressure is let down and the mixture is cooled to 120° C. and then diluted with 80 parts of isobutanol.

USE EXAMPLES

EXAMPLE 5

Use of a novel urea condensate in a conventionally applied white finish:

A non-self-crosslinking polyadduct is first prepared. For this purpose, 400 parts of hexamethylenediamine are heated to 80° C. Thereafter, an 80% strength solution of 400 parts of a commercial epoxy resin based on 2,2-bis-(4-hydroxyphenyl)-propane and having an epoxide equivalent weight of 500, in toluene, is added. After the initial exothermic reaction has abated, the mixture is allowed to continue reacting for 30 minutes at 100° C. Excess hexamethylenediamine and toluene are then distilled off under reduced pressure, the internal temperature reaching 180° C. Thereafter, the residual traces of free amine are stripped off under 0.5 mbar and at 180° C. in a thin-film evaporator. The epoxide/amine adduct has an amine number of 169 mg of KOH/g and a softening point of 95° C.

100 parts of this resin, 120 parts of ethylglycol, 88.6 parts of butylglycol, 80 parts of titanium dioxide and 71.4 parts of the urea condensate from Example 3 are stirred while heating and then milled in a sand mill until the particle size according to DIN 53,203 is 10 μm. After the grinding medium has been separated off, the resulting surface coating solution has a solids content of 50%. This solution is applied onto steel sheets by means of a knife-coater (thickness of wet film 100 μm) and is baked for 20 minutes at 140° C. The resulting highly glossy, hard and flexible surface coating film is completely resistant to acetone (after rubbing up and down 100 times with a ball of cotton wool impregnated with acetone).

Use of the novel urea condensates in cathodic electrocoating finishes:

EXAMPLE 6

A non-self-crosslinking cathodic binder is first prepared. For this purpose, 200 parts of the epoxide/amine adduct from Example 5, 30 parts of a dimeric fatty acid and 20 parts of xylene are heated gradually to 190° C., water being separated off, and are left at this temperature for one hour. After cooling to 130° C., the mixture is diluted first with 9 parts of butylglycol and then with 70 parts of isobutanol. The product has a solids content of 70%.

42.8 parts of the urea condensate from Example 1 are added to 100 parts of this solution, and the mixture is mixed with 2.4 parts of acetic acid.

EXAMPLE 7

42.8 parts of the urea condensate from Example 2 are added to 100 parts of the non-self-crosslinking cathodic binder from Example 6, and the mixture is mixed with 2.4 parts of acetic acid.

EXAMPLE 8

42.8 parts of the urea condensate from Example 3 are added to 100 parts of the non-self-crosslinking cathodic binder from Example 6. After 2.2 parts of acetic acid have been added, the product can be diluted with water.

Testing the binders

For testing as cathodic electrocoating finishes, 10% strength dispersions are prepared from the binders to which acid has been added by adding fully demineralized water. Portions of 1,000 parts of each of the binder dispersions are added, while stirring, to 66 parts of a pigment paste prepared as described below:

Pigment paste

A binder paste is prepared according to Example (1a) of German Laid-Open Application DOS 3,121,765. For this purpose, 200 parts of ethylene glycol monobutyl ether are heated to 90° C. in a reaction vessel. A mixture of 396 parts of N-vinylpyrrolidone, 204 parts of vinyl propionate and 1.2 parts of azobisisobutyronitrile is then added dropwise in the course of 2 hours. Finally, polymerization is continued for 1 hour at 90° C. The resulting solution polymer has a Fikentscher K value of 24. The solids content of the copolymer solution is 76%.

In a stirred ball mill, 250 parts of this copolymer solution, 210 parts of ethylene glycol monobutyl ether, 555 parts of ethylene glycol monoethyl ether, 837 parts of fully demineralized water, 1,084 parts of kaolin, 217 parts of basic lead silicate, 145 parts of carbon black, 36 parts of rutile and 3,000 parts of glass beads having a diameter of 2 mm are stirred for 45 minutes at a speed of 1,000 rpm. After the glass beads have been separated off, the resulting black paste has a solids content of 50.6%.

The electrocoating baths prepared in this manner are stirred for 48 hours at 30° C. Surface coating films are deposited, in the course of 2 minutes at the voltage stated in the Table, onto zinc-phosphatized steel test sheets which have been made the cathode, and the films are baked for 20 minutes at 180° C., at 160° C., and at 140° C. Thereafter, the resistance to acetone is tested by rubbing up and down 50 times with a ball of cotton wool impregnated with acetone, and the flexibility is tested by means of the impact penetration work. The Table below shows the results:

| | | Results of the binder test (layer thickness 17 μm) | | | |
|---|---|---|---|---|---|
| Binder | pH | Throwing power according to Ford for a layer thickness of 17 μm | Resistance to acetone at the baking temperature | Impact penetration work in × lb | Salt spray test according to ASTM; penetration at the crack |
| Example 6 | 7.9 | 20 cm (280 V) | 1 (160° C.) | 160 | 500 h 0.5 mm |
| | | | 2 (140° C.) | 80 | 500 h 0.5–1 mm |
| Example 7 | 8.0 | 22 cm (260 V) | 1 (160° C.) | 160 | 500 h 0.3 mm |
| | | | 1 (140° C.) | 160 | 500 h 0.5 mm |
| Example 8 | 8.2 | 21.5 cm (300 V) | 1 (160° C.) | 160 | 500 h 0.1 mm |
| | | | 1 (140° C.) | 160 | 500 h 0.5 mm |

We claim:

1. A process for the preparation of urea condensates, wherein
   (A) at least one primary di- or polyamine or a mixture of di- and polyamines is reacted with
   (B) urea, and
   (C) at least one secondary monoamine
   at elevated temperatures and in the presence or absence of catalysts, and the ammonia formed is separated off.

2. The process of claim 1, wherein the ratio of the number of equivalents of $NH_2$ groups of the primary di- or polyamine or mixture of di- and polyamines (A) to $NH_2$ groups of the urea (B) to NH groups of the secondary monoamine (C) is 1 to 1.2–2.4 to 0.2–20.

3. The process of claim 1, wherein the primary di- or polyamine or mixture of di- and polyamines (A) used is an aliphatic primary di- or polyamine or a mixture of aliphatic primary di- and polyamines whose primary amino groups are separated from one another by more than 3 carbon atoms, or a cycloaliphatic or aromatic polyamine whose primary amino groups are separated from one another by at least 3 carbon atoms.

4. The process of claim 3, wherein the ratio of the number of equivalents of $NH_2$ groups of the primary di- or polyamine or mixture of di- and polyamines (A) to $NH_2$ groups of the urea (B) to NH groups of the secondary monoamine (C) is 1 to 1.2–2.4 to 0.2–20.

5. The process of claim 1, wherein a polyalcohol (D) having a molecular weight of from 60 to 5,000 and containing from 2 to 10 hydroxl groups is reacted with components (A), (B), and (C).

6. The process of claim 2, wherein a polyalcohol (D) having a molecular weight of from 60 to 5,000 and containing from 2 to 10 hydroxyl groups is reacted with components (A), (B) and (C).

7. The process of claim 3, wherein a polyalcohol (D) having a molecular weight of from 60 to 5,000 and containing from 2 to 10 hydroxl groups is reacted with components (A), (B) and (C).

8. The process of claim 1, wherein an excess of secondary monoamine is employed and the excess is distilled off under reduced pressure at the end of the reaction.

9. The process of claim 1, wherein the reaction is carried out under a pressure of from 0.1 to 20 bar.

10. The process of claim 1, wherein the reaction is carried out at a temperature of from 120° to 230° C.

11. The process of claim 1, wherein a secondary amine having a boiling point between 100° and 200° C. is employed as component (C).

12. The process of claim 1, wherein di-n-butylamine is employed as the secondary amine.

13. Urea condensates obtainable by a process of claim 1.

14. Urea condensates produced by a process of claim 2.

15. Urea condensates produced by the process of claim 3.

16. A binder for thermosetting surface coatings, comprising from 50 to 98% by weight of a self-crosslinking surface coating binder which consists essentially of at least one polyadduct, polycondensate or polymer, each having a mean molecular weight $M_n$ of from 500 to 10,000 and possessing, on average, at least two functional groups selected from OH groups and primary and secondary amino groups, and from 2 to 50% by weight of a urea condensate prepared by the process of claim 1.

17. A binder for thermosetting surface coatings, comprising from 40 to 90% by weight of a nonself-crosslinking surface coating binder which consists essentially of at least one polyadduct, polycondensate or polymer, each having a mean molecular weight $M_n$ of from 500 to 10,000 and possessing, on average, at least two functional groups selected from OH groups and primary and secondary amino groups, and from 10 to 60% by weight of a urea condensate prepared by the process of claim 1.

18. Urea condensates produced by the process of claim 4.

19. Urea condensates produced by the process of claim 5.

20. Urea condensates produced by the process of claim 6.

21. Urea condensates produced by the process of claim 7.

22. A binder for thermosetting surface coatings, comprising from 50 to 98% by weight of a self-cros-linking surface coating binder which consists essentially of at least one polyadduct, polycondensate or polymer, each having a mean molecular weight $M_n$ of from 500 to 10,000 and possessing, on average, at least two functional groups selected from OH groups and primary and secondary amino groups, and from 2 to 50% by weight of a urea condensate prepared by the process of claim 5.

23. A binder for thermosetting surface coatings, comprising from 40 to 90% by weight of a nonself-crosslinking surface coating binder which consists essentially of at least one polyadduct, polycondensate or polymer, each having a mean molecular weight $M_n$ of from 500 to 10,000 and possessing, on average, at least two functional groups selected from OH groups and primary and secondary amino groups, and from 10 to 60% by weight of a urea condensate prepared by the process of claim 5.

24. The process of claim 5 wherein the ratio of the number of equivalents of $NH_2$ groups of the primary di- or polyamine or mixture of di- and polyamines (A) to $NH_2$ groups of the urea (B) to NH groups of the secondary monoamine (C) to OH groups of the polyalcohol (D) is 1 to 1.2–2.4 to 0.2–20 to 0–0.9.

* * * * *